(12) United States Patent
Lai

(10) Patent No.: US 7,369,761 B2
(45) Date of Patent: May 6, 2008

(54) METHOD OF REMOTE CAPTURE WITH USER INTERFACE PROVIDING SEPARATE INSIDE- AND OUTSIDE-LIGHT-BOX MODES

(75) Inventor: Peng-Cheng Lai, Panchiao (TW)

(73) Assignee: Ortery Technologies, Inc., Panchiao (TW)

( * ) Notice: Subject to any disclaimer, the term of this patent is extended or adjusted under 35 U.S.C. 154(b) by 437 days.

(21) Appl. No.: 11/200,080

(22) Filed: Aug. 10, 2005

(65) Prior Publication Data

US 2006/0061665 A1    Mar. 23, 2006

(30) Foreign Application Priority Data

Sep. 17, 2004   (TW) .............................. 93128195 A

(51) Int. Cl.
*G03B 17/00*   (2006.01)
(52) U.S. Cl. .............. 396/263; 348/211.99; 348/207.11
(58) Field of Classification Search ................ 396/263; 348/211.99, 207.11
See application file for complete search history.

(56) References Cited

U.S. PATENT DOCUMENTS

2006/0020524 A1*   1/2006   Yeko et al. ................... 705/27

* cited by examiner

*Primary Examiner*—W. B. Perkey
*Assistant Examiner*—Warren K Fenwick
(74) *Attorney, Agent, or Firm*—Muncy, Geissler, Olds & Lowe, PLLC

(57) ABSTRACT

A method of remote capture with user interface providing separate inside- and outside-light-box modes is provided, wherein when the user selects the inside-light-box mode together with an automatic mode to take a photograph, it is the photographic parameters, which are obtained experimentally for various cameras under given light sources, but not the photographic parameters, which are automatically generated by the light sensor of the camera, that are utilized to control the camera. Via the inside-light-box mode together with the automatic mode, an image in good qualities is acquired.

7 Claims, 5 Drawing Sheets

METHOD OF REMOTE CAPTURE WITH USER INTERFACE PROVIDING SEPARATE INSIDE- AND OUTSIDE-LIGHT-BOX MODES

BACKGROUND OF THE INVENTION

1. Field of the Invention

The present invention relates to remote capture with user interface, particularly to a method of remote capture with user interface providing separate inside- and outside-light-box modes.

2. Description of the Related Art

When utilizing a digital camera, most of the users adjust the lighting instruments by themselves for taking human or product pictures. Even though the light source inside a light box is more uniform, taking a picture inside a light box is not a common adoption because most of the users are not accustomed to complicated remote capture software provided by camera manufacturers and also because only few camera manufacturers provide remote capture software for the users. Besides, camera manufacturers also usually provide incomplete software development kits for system-integrator to develop custom-made capture software. Therefore, few of them can integrate the environment of a light box and remote capture software into a complete system.

As shown in FIG. 1A, a general user interface 200 has an Auto Exposure function, i.e. the AE mode 202, which further provides the options: Manual mode 204, Automatic mode (Program AE) 206, Shutter Speed Priority mode 208, Aperture-Priority mode 210. Refer to FIG. 1B the flowchart of using the conventional user interface. When the user intends to take a photograph with a camera, he starts to operate the user interface (step S10). Next, the user selects the Manual mode 204 or the Automatic mode (Program AE) 206 (step S12). Once the Automatic Mode (Program AE) 206 is selected (step S14), photographic parameters will be automatically created and associated with the light sensor of a capturing apparatus (not shown) (step S16). If the Manual mode 204 is selected (step S18), photographic parameters will be manually set (step S20). After the photographic parameters have been created or set, the user utilizes the preview function of the user interface to observe the position and the dimension of an object (step S22). Then, the user utilizes the zoom-in and the zoom-out functions of the user interface to adjust the image size of the object (step S24 and step S26). Finally, the user snaps a photograph (step S28). However, this conventional technology cannot obtain the optimal photographic parameters. Besides, external factors will also interfere with photographing. Therefore, the images captured with the conventional technology do not always achieve the desired quality.

As the light sensors of different digital cameras have different light sensitivities, and owing to the variation of lighting environments and the variation of the distance between the light sensor and the photographed object, the photographic parameters created by a light sensor may have a considerable error. Further, when the user undertakes a top shot, the fixing mechanism of the digital camera is apt to block the light detection, which also results in the error of the photographic parameters.

Therefore, it is necessary to integrate the lighting environment of a light box and a remote capture software into a complete system. To achieve a superior image, the photographic parameters for a specific camera should be experimentally obtained under the real light source of a light box. Those photographic parameters are to be further preset in the remote capture software of a user interface. Thereby, when the user takes a photograph inside the light box with the automatic mode, a superior image can be obtained. Based on the above discussion, the present invention proposes a method of remote capture user interface with separate inside- and outside-light-box modes to overcome the problems.

SUMMARY OF THE INVENTION

One of objectives of the present invention is to provide a method of remote capture with user interface providing separate inside- and outside-light-box modes in order to create an image in good quality.

Another one of objectives of the present invention is to reduce interference occurring in the light detection of a light sensor in order to obtain the optimized photographic parameters.

Further, one of objectives of the present invention is to integrate the lighting environment of a light box and a remote capture software into a unitary system and popularize it.

The present invention proposes a method of remote capture with user interface providing separate inside- and outside-light-box modes, wherein when operating the capture user interface, firstly the user may select the inside-light-box mode or the outside-light-box mode determined; next, the user may select an automatic mode or a manual mode; after the selection of the above mentioned modes, the succeeding preview, zoom-in, and zoom-out functions will be undertaken; and then, a snap is executed.

To enable the objectives, technical contents, characteristics, and accomplishments of the present invention to be more easily understood, the embodiments of the present invention are to be described below in detail in cooperation with the attached drawings.

DETAILED DESCRIPTION OF THE INVENTION

The present invention proposes a method of remote capture user interface with separate inside- and outside-light-box modes, wherein when the inside-light-box mode together with an automatic mode is adopted, the preset photographic parameters in the remote-capture software will replace the photographic parameters automatically created by the light sensor in a general camera.

Figure 1A:
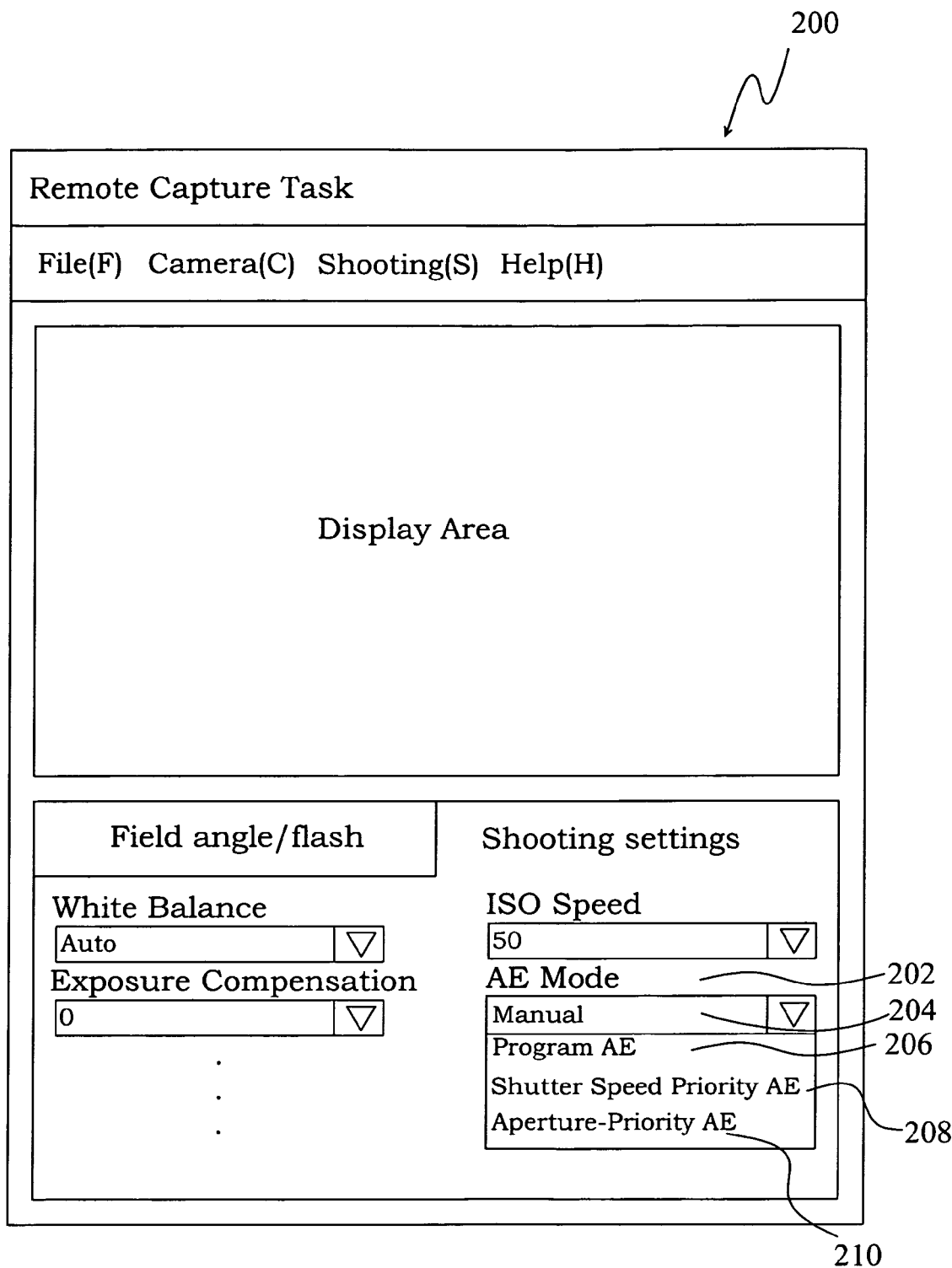
FIG. 1A is a general schematic user interface to provide the camera settings with a remote capture task in the prior art.
Figure 1B:
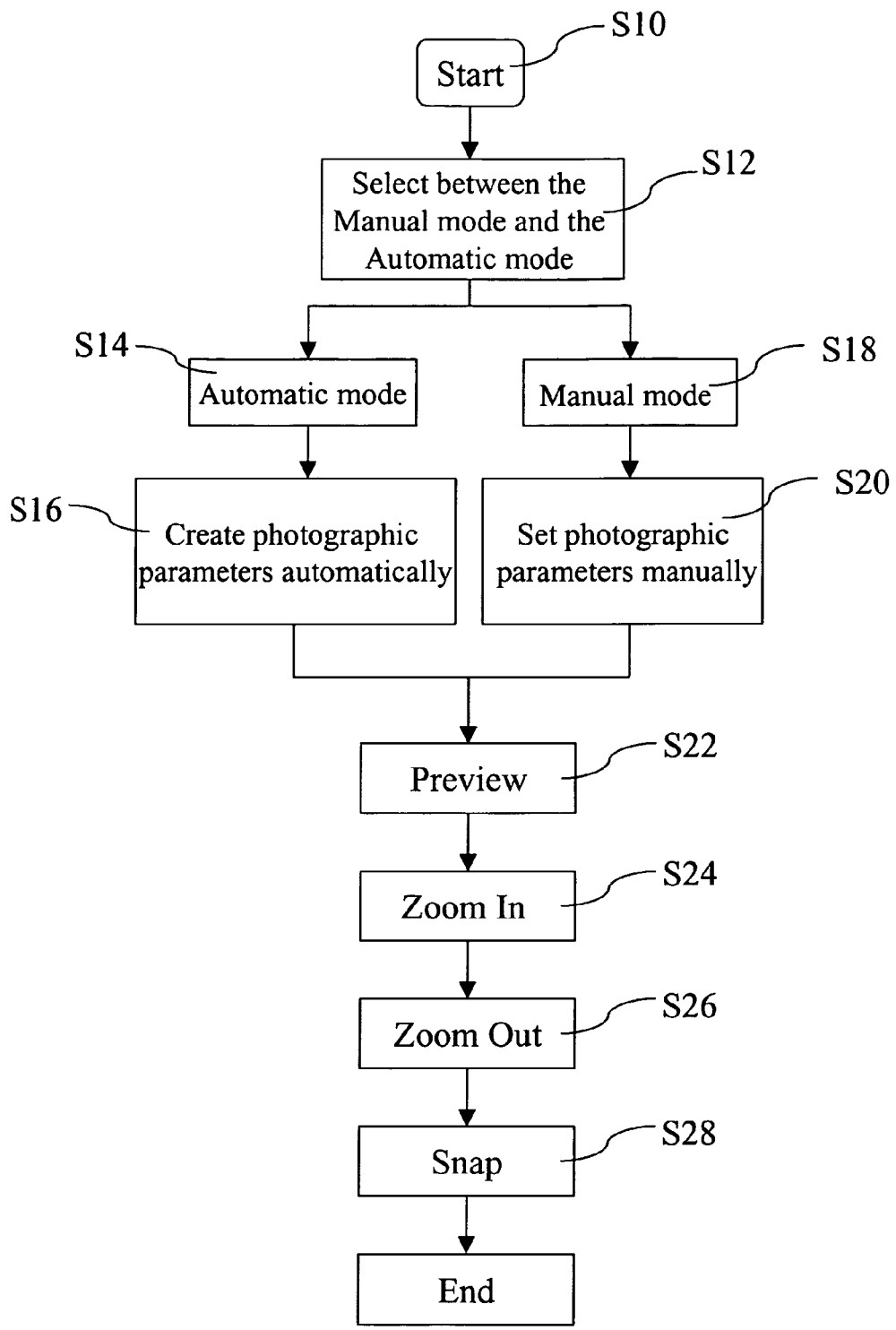
FIG. 1B is a flowchart of a conventional technology.
Figure 2A:
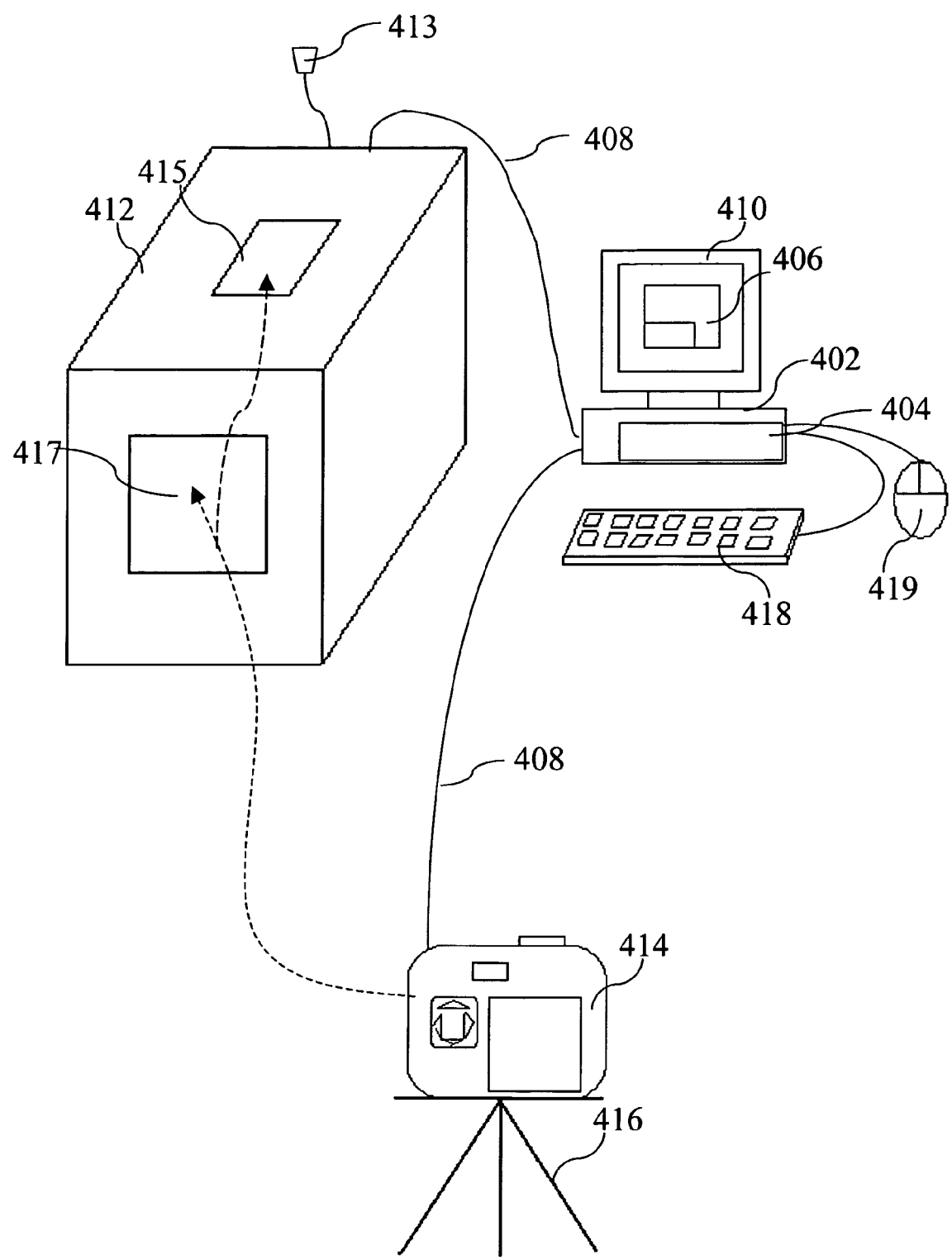
FIG. 2A is a schematic diagram showing the peripheral equipments used in the method according to one embodiment of the present invention.
Figure 2B:
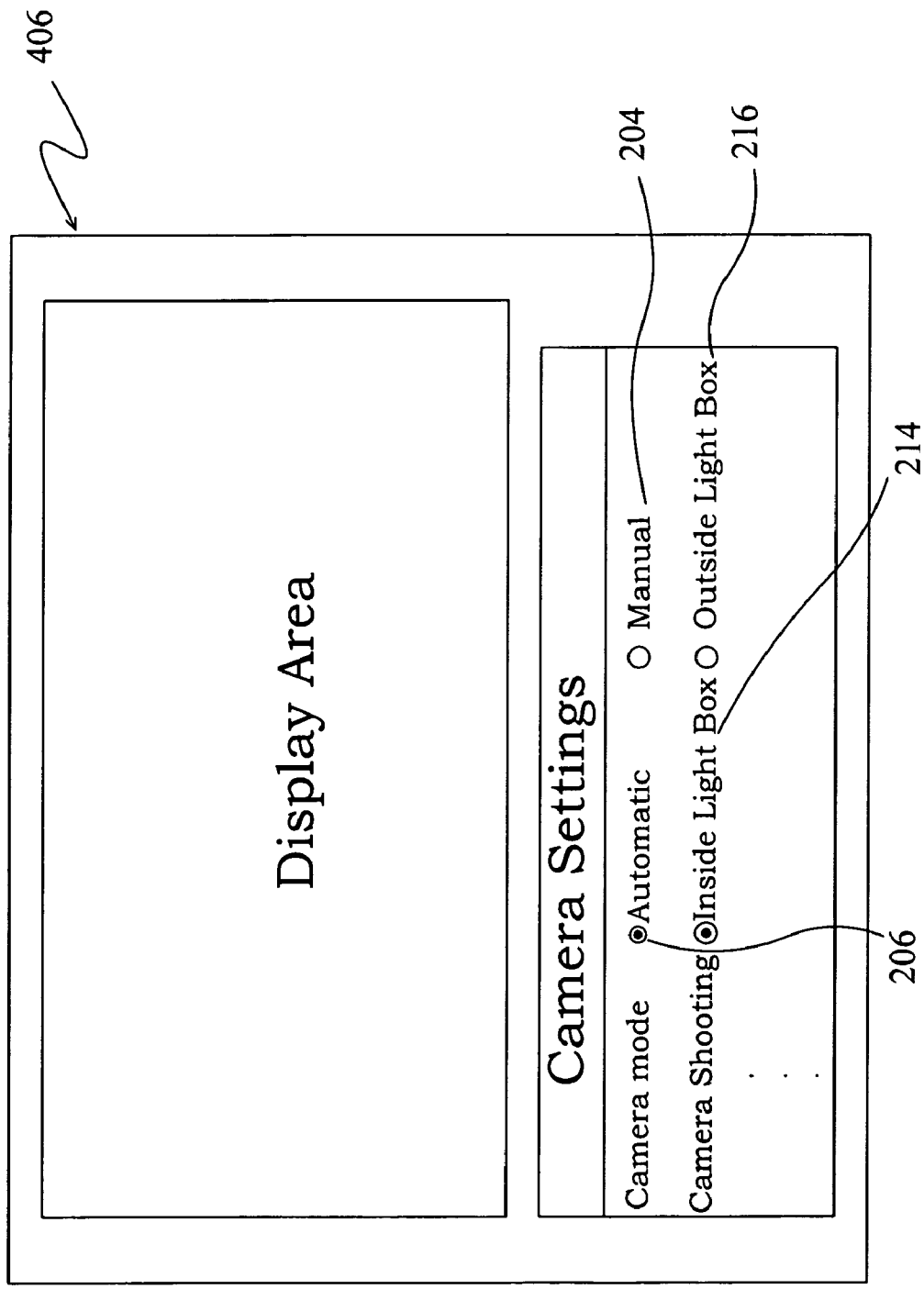
FIG. 2B is a schematic use interface to provide the camera settings in accordance with the preferred embodiment of the present invention.

Refer to FIG. 2A a schematic diagram showing the peripheral equipments used in the method according to the present invention. Firstly, a remote capture software 404 installed in a computer 402 is initiated, and in reference to FIG. 2B, a simplified user interface 406 of the remote capture software 404, which provides inside-light-box mode 214 and outside-light-box mode 216, is presented on a screen 410. A power cable 413 is configured to provide power for a light box 412. The remote-capture software 404 installed in the computer 402 controls lighting instruments of the light box 412 and a camera 414 via a signal cable 408. The user may undertake top shots 415 from the top of the light box 412 or side shots 417 with a tripod 416 from the lateral side of the light box 412. The user utilizes the user interface 406 to select the inside-light-box mode 214 or the outside-light-box mode 216. Once a light-box mode is selected, the user continues to select an automatic mode 206 or a manual mode 204 for capturing a picture. The user interface 406 may be operated with a human-machine interface, such as hardware keyboard 418 or a mouse 419.

Figure 3:
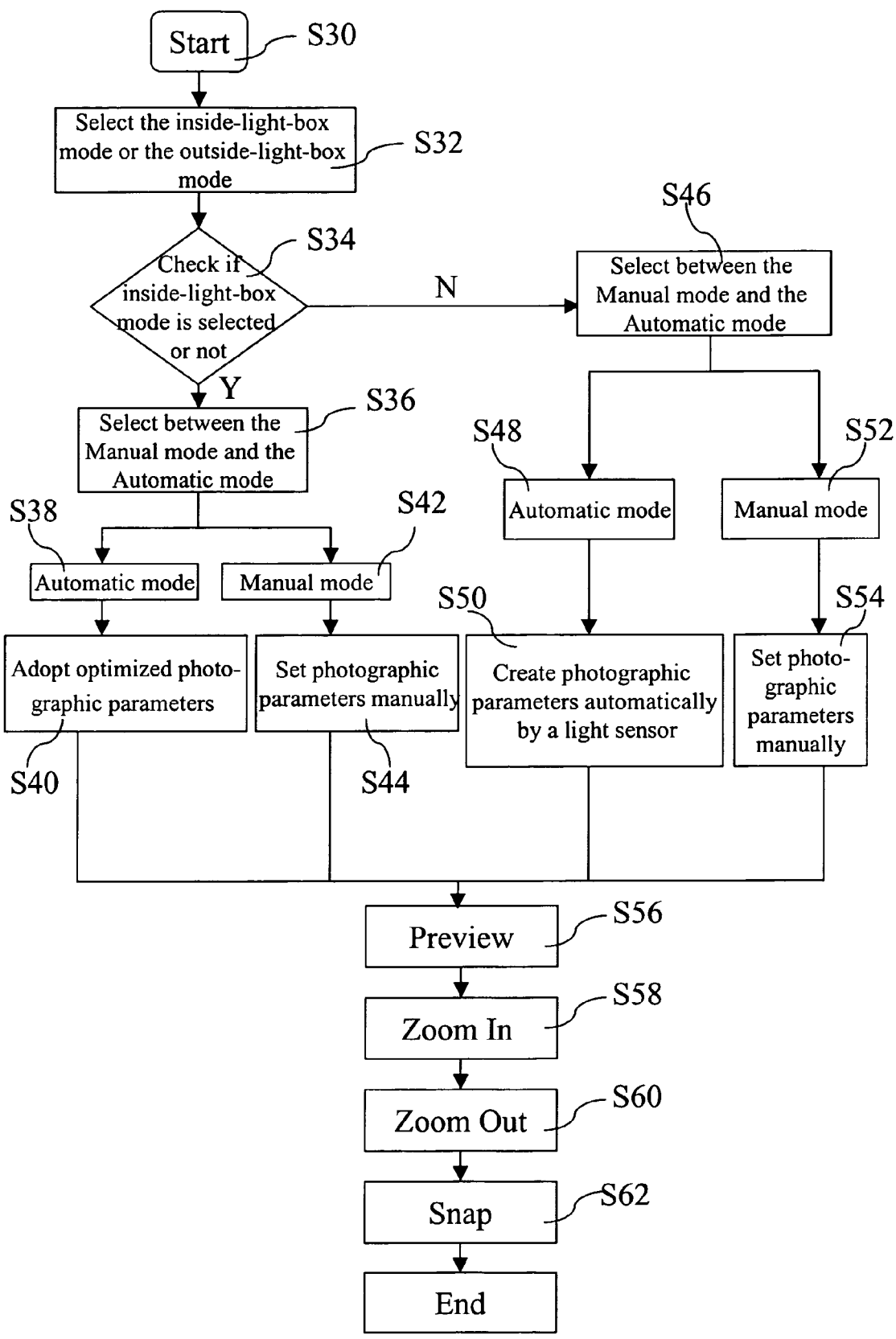
FIG. 3 is a flowchart of the method of a remote capture interface according to one embodiment of the present invention.

Refer to FIG. 3 a flowchart of the remote capture method according to one embodiment of the present invention. When intending to take a photograph with a camera 414, the user starts to operate the user interface 406 (step S30). The user interface 406 provides the inside-light-box mode 214 and the outside-light-box mode 216 for the user (step S32). Next, the user selects the inside-light-box mode 214 or the outside-light-box mode 216 (step S34).

For the selection of the inside-light-box mode 214 in step S34, the user further selects an automatic mode 206 or a manual mode 204 (step S36). In the condition of the selected automatic mode 206 (step S38), the optimized photographic parameters may be adopted, which are experimentally obtained for various cameras under given light sources inside the light box 412 (step S40). In the condition of the selected manual mode 204 (step S42), photographic parameters may be manually set (step S44).

For the selection of the outside-light-mode 216 in step S34, the user further selects between the automatic mode 206 and the manual mode 204 (step S46). In the condition that automatic mode 206 is selected (step S48), photographic parameters may be automatically generated by the light sensor of the camera 414 (step S50). In the condition of the selected manual mode 204 (step S52), photographic parameters may be manually set (step S54).

Once the settings of the photographic parameters are completed, the user may utilize the preview function of the user interface 406 to observe the position and dimension of an object (step S56). Then, the user may utilize the zoom-in and zoom-out functions of the user interface 406 to adjust the image size of the object (step S58 and step S60). Finally, the user snaps a photograph (step S62).

The difference between the present invention and the conventional technology is that when the user selects the inside-light-box mode and the automatic mode together to take a photograph, the photographic parameters, which are experimentally obtained for various cameras, will replace the photographic parameters which are automatically generated by the light sensor of a general camera.

Those embodiments described above are only to clarify the present invention but not intended to limit the scope of the present invention. Any equivalent modification or variation without departing from the spirit of the present invention disclosed herein is to be included within the scope of the claims stated below.

What is claimed is:

1. A method of remote capture with a user interface providing inside- and outside-light-box modes, wherein when a camera is used to capture photographs, said user interface provides separate inside-light-box mode and outside-light-box mode, comprising:
   selecting one of said inside-light-box mode and said outside-light-box mode, with said user interface; and
   selecting one of an automatic mode and a manual mode, with said user interface.

2. A method of remote capture with a user interface providing inside- and outside-light-box modes, wherein when a camera is used to capture photographs, said user interface presents separate inside-light-box mode and outside-light-box mode for selection, and wherein when said inside-light-box mode together with an automatic mode is selected, optimized photographic parameters experimentally obtained for different cameras under given light sources are to be adopted.

3. The method of remote capture with a user interface providing inside- and outside-light-box modes according to claim 1, wherein said user interface is presented on a screen.

4. The method of remote capture with a user interface providing inside- and outside-light-box modes according to claim 1, wherein said user interface is operated with a hardware keyboard, a human-machine interface, or a display panel of a remote controller.

5. The method of remote capture with a user interface providing inside- and outside-light-box modes according to claim 2, wherein said optimized photographic parameters experimentally obtained for said camera under the light source inside said light box are used to control said camera to capture photographs.

6. The method of remote capture with a user interface providing inside- and outside-light-box modes according to claim 2, wherein a symbol or a letter is used to guide said photographic parameters in.

7. The method of remote capture with a user interface providing inside- and outside-light-box modes according to claim 1, wherein said inside-light-box mode and said outside-light-box mode are shown on different user interfaces, individually.

* * * * *